Oct. 4, 1966    L. D. DUNN ET AL    3,276,491
SAW BLADE
Filed Aug. 2, 1963    3 Sheets-Sheet 1
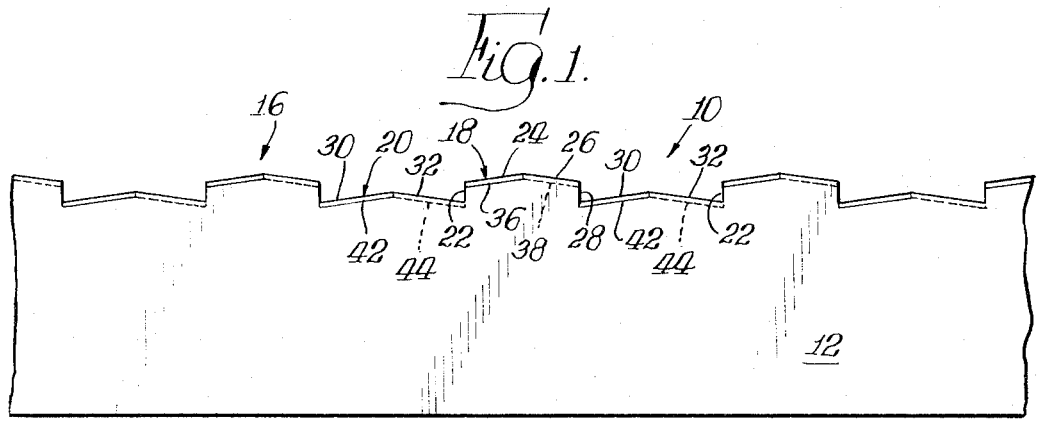
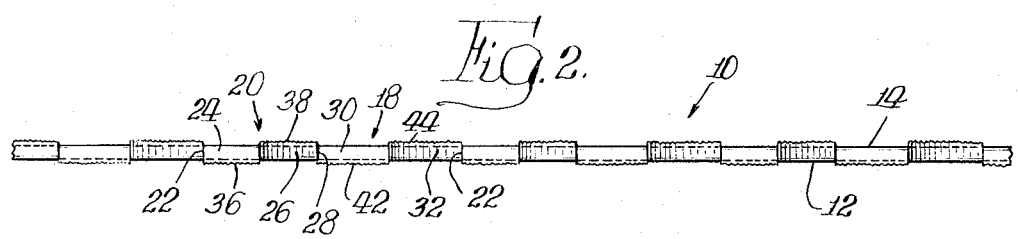
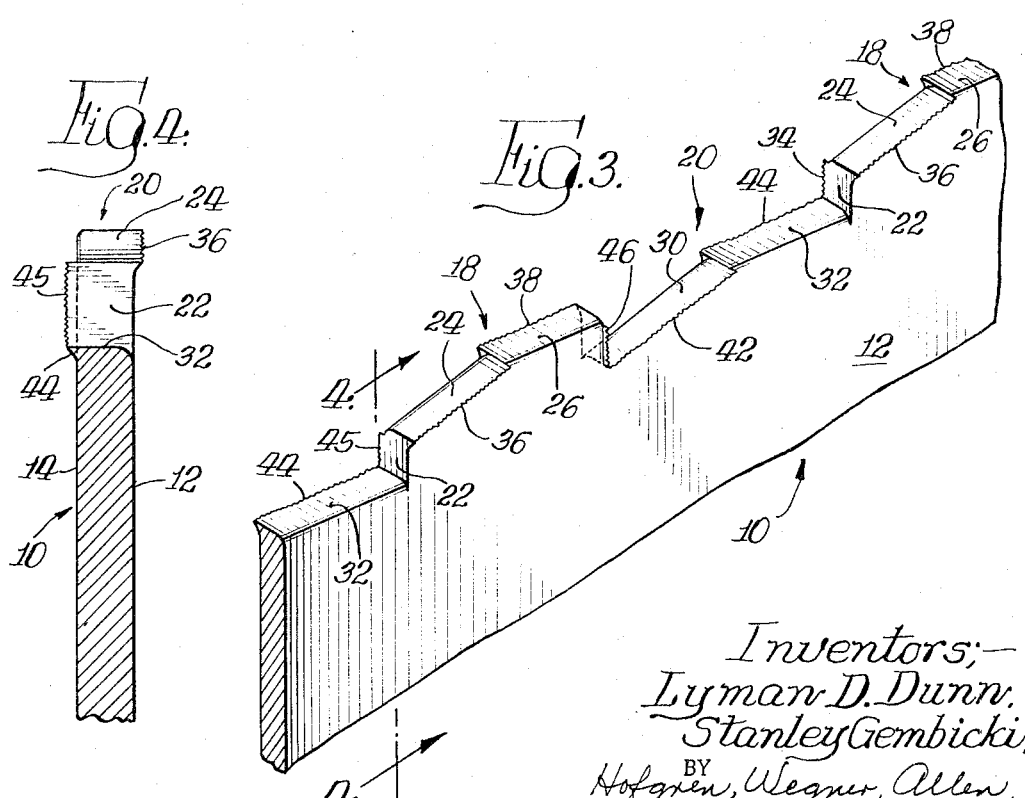
Inventors:—
Lyman D. Dunn,
Stanley Gembicki,
BY
Hofgren, Wegner, Allen,
Stellman & McCord Attys.

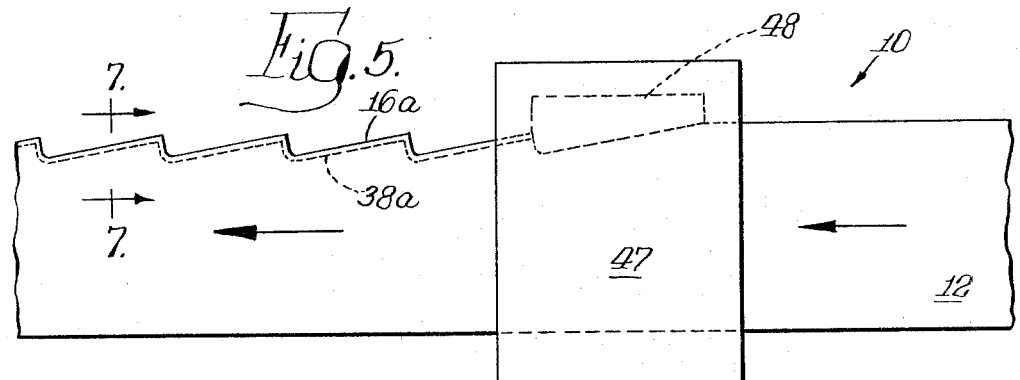
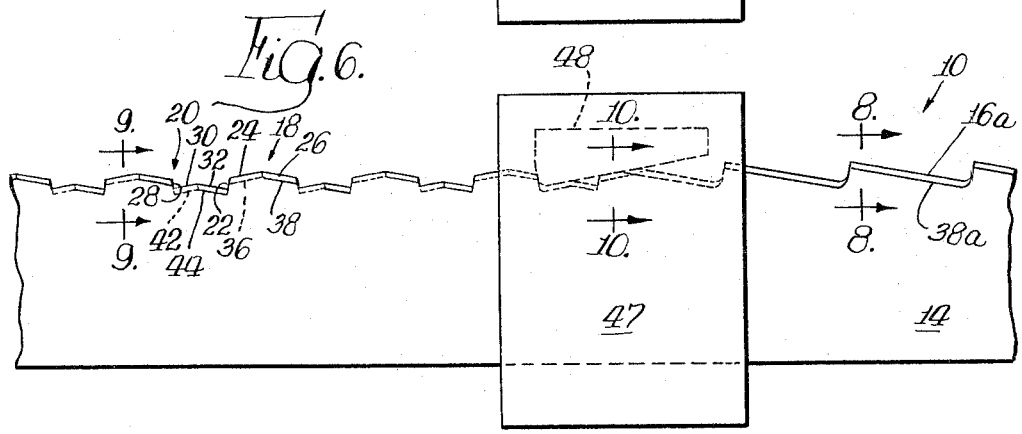
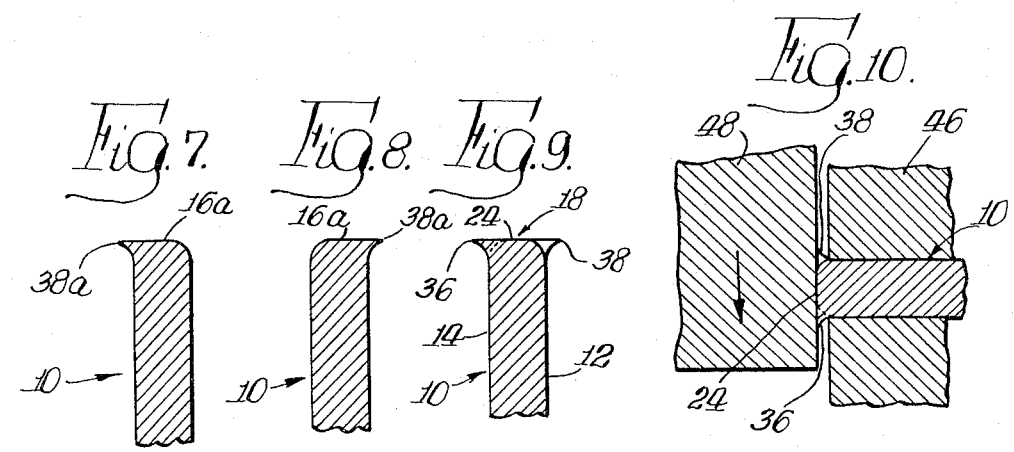

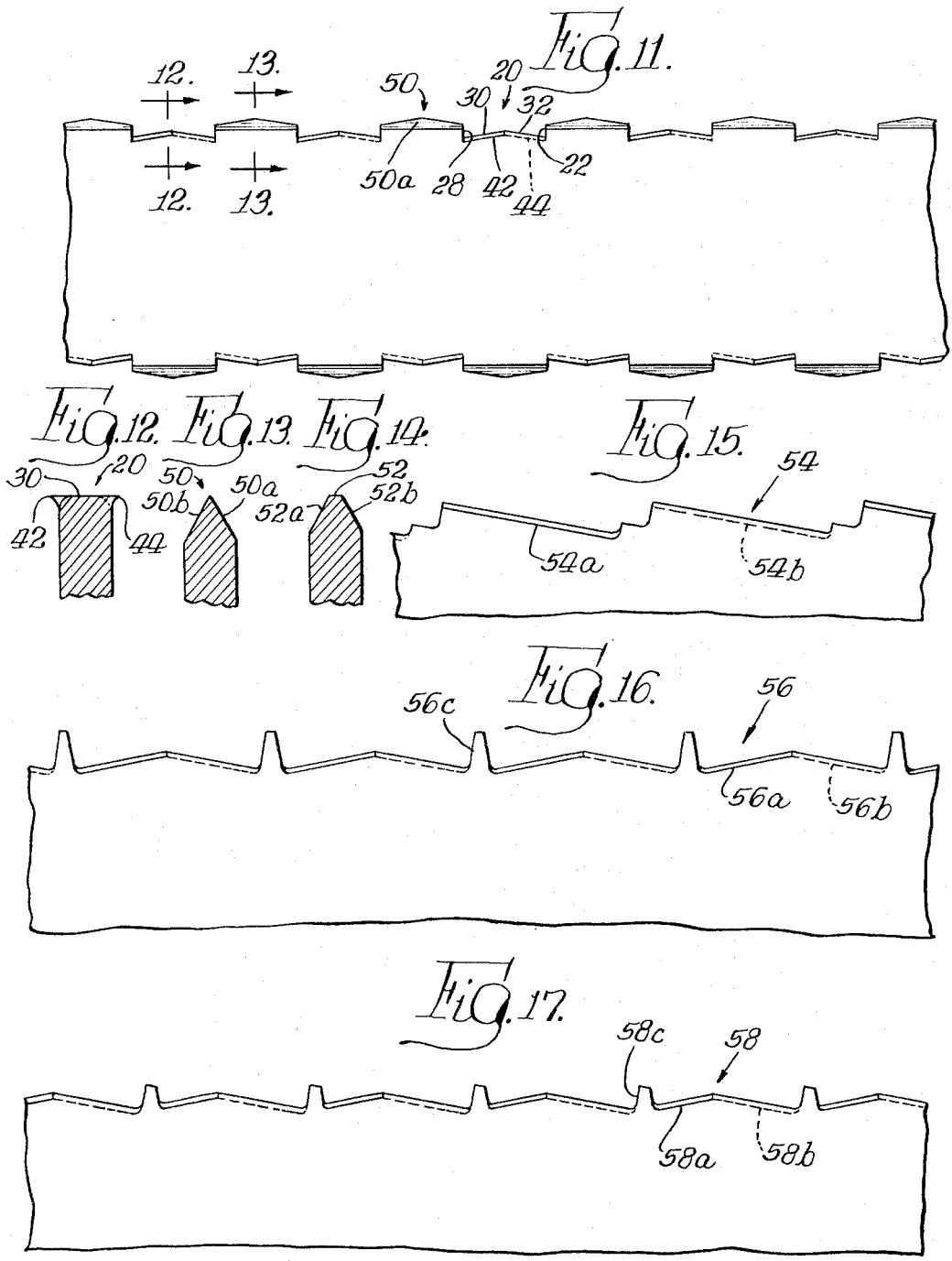

United States Patent Office 3,276,491
Patented Oct. 4, 1966

3,276,491
SAW BLADE
Lyman D. Dunn, Chicago, and Stanley Gembicki, Des Plaines, Ill., assignors to Marlan Company, a corporation of Illinois
Filed Aug. 2, 1963, Ser. No. 299,625
5 Claims. (Cl. 143—133)

This application relates to saw blades and more particularly to a new and improved saw blade having burred edges on the teeth thereof.

Hitherto known saw blades have generally possessed teeth which were "set" or misaligned relative to the blade. It was thought necessary to set the teeth in order that the saw could cut properly without binding and to remove chips. Since setting of the teeth was a definite step in the production of the saw, it added to the expense thereof. If this step in the production of the saw could be eliminated, a substantial savings could result in the manufacture of the blades and in the amount of material removed from the product being cut.

Some saws have been developed which utilized burred edges on the teeth but still retained the set or misaligned teeth as previously described. Thus it was unknown to utilize saw blades having teeth which were substantially aligned along the blade and had burrs thereon.

It is therefore a general object of this invention to provide a new and improved saw blade.

It is a primary object of this invention to provide a new and improved saw blade which is free from the objections mentioned above.

It is another object of this invention to provide a new and improved saw blade having a plurality of aligned cutting teeth.

It is yet another object of this invention to provide a new and improved saw blade having a plurality of aligned teeth with oppositely arranged burrs on the successive teeth.

It is still another object of this invention to provide a new and improved saw blade having a plurality of aligned teeth with oppositely arranged burrs on the successive teeth wherein the oppositely arranged burrs control the path and contour the cut of the blade.

It is a further object of this invention to provide a new and improved saw blade which will cut equally well in either direction.

It is yet a further object of this invention to provide a new and improved saw blade having a plurality of aligned burred teeth wherein the front edge of each tooth is burred in a direction opposite the top edge which is adjacent thereto.

It is still a further object of this invention to provide a new and improved saw blade having a plurality of aligned oppositely burred teeth wherein some of the teeth are sharpened to remove a portion of the burrs thereof.

Other objects, features and advantages of the present invention will be apparent from the following description of the preferred embodiments illustrated in the accompanying drawings, in which:

FIGURE 1 is a fragmentary side elevational view of a blade of this invention;

FIGURE 2 is a fragmentary top plan view of the blade shown in FIGURE 1;

FIGURE 3 is a fragmentary perspective view of the blade shown in FIGURES 1 and 2;

FIGURE 4 is a section view taken along the line 4—4 of FIGURE 3;

FIGURE 5 is a fragmentary view showing a step in the formation of the blade of this invention;

FIGURE 6 is a fragmentary view showing a subsequent step in the formation of the blade of this invention;

FIGURE 7 is an enlarged fragmentary section view taken along the line 7—7 of FIGURE 5;

FIGURE 8 is an enlarged fragmentary section view taken along the line 8—8 of FIGURE 6;

FIGURE 9 is an enlarged fragmentary section view taken along the line 9—9 of FIGURE 6;

FIGURE 10 is an enlarged fragmentary section view taken along the line 10—10 of FIGURE 6;

FIGURE 11 is a fragmentary view of a modification of the blade of this invention;

FIGURE 12 is a fragmentary enlarged section view taken along the line 12—12 of FIGURE 11;

FIGURE 13 is a fragmentary enlarged section view taken along the line 13—13 of FIGURE 11;

FIGURE 14 is an enlarged fragmentary section view of a tooth edge of a modified embodiment of this invention;

FIGURE 15 is a fragmentary enlarged view of a modified form of the tooth configuration of the blade of this invention;

FIGURE 16 is a fragmentary enlarged view of another modified form of the blade configuration of this invention; and FIGURE 17 is a fragmentary enlarged view of another modified form of the blade configuration of this invention.

Referring now to the drawings, in FIGURES 1–4 there is shown the saw blade 10 of this invention having two flat sides 12 and 14 and a toothed edge 16. In the embodiment illustrated in FIGURES 1–4, the toothed edge 16 consists of raised teeth 18 and lowered teeth 20.

Referring particularly to FIGURES 2 and 3, it can be clearly seen that the teeth 18 and 20 are in substantial alignment and are not "set" or misaligned relative to the saw blade as has been conventional with previous saw blades. The tooth 18 has a generally upright front edge 22, an upwardly inclined top edge 24, a downwardly sloping top edge 26 and a substantially upright rear edge 28. Similarly, the teeth 20 have upwardly inclined top edges 30 and downwardly sloping bottom edges 32 which join at the base of the next succeeding front edge 22. It is to be noted that the tooth edges, 26, 28, and 30, 32 are flat.

Each tooth surface has an oppositely arranged burr projecting slightly over the side wall 12 or 14. Thus the tooth surface 24 has a burr 36 extending over the side 12 while the surface 26 has a burr 38 over the side 14. Similarly, the surfaces 30 and 32 of the tooth 20 have burrs 42 and 44, respectively, which extend over the sides 12 and 14, respectively.

It is to be noted that the burr 45 on the front edge 22 of the tooth 18 faces over the side 14 while burr 36 on the surface 24 immediately adjacent the front edge 22 faces over the side 12 of the blade. The same is relatively true of burr 46 on the rear edge 28 of the tooth 18. Burr 46 extends over the side 12 whereas burr 38 on the top edge 26 extends over the side 14. Thus the burrs on the top surface of the tooth 18 extend over the side of the blade which is opposite to the burr formed on the front and rear edge thereof independent of the direction of the blade or direction of the work piece moving relative thereto.

The blade configuration shown in FIGURES 1–4 has been found to be especially effective in cutting hard materials, such as metal.

FIGURES 5 and 6 illustrate a means by which the blade illustrated in FIGURES 1–4 may be produced. In FIGURE 7, a punch diagrammatically illustrated at 47 having a die 48 is used to punch a conventional saw tooth edge 16a in a saw blade blank. The punching is done from the side 12 thereby producing burrs 38a on the opposite side of the blade. As shown in FIGURE 6, by using the same punch 47 and having the same die 48 and by punching from the opposite side 14 of the blade using the previously punched teeth as an index the punch cuts away a controlled portion of the teeth 16a and produces controlled burrs on the opposite side 12 of the blade, and produces the tooth edge 16 as described and shown in FIGURES 1–4. FIGURES 7–10 clearly illustrate the burr produced by the first punching to form the first tooth edge 16a as well as the burrs formed by the second punching to produce the ultimate tooth edge 16 consisting of the oppositely burred teeth 18 and 20.

In FIGURE 11 an alternate embodiment of this invention is shown. Here the raised or protruding teeth 18 have been ground to form a sharp tooth 50 having beveled sides 50a and 50b. However, the remaining features of the blade are similar to that shown in FIGURES 1–10, and the lower teeth 20 still retain the relatively flat top surfaces 30 and 32 and the oppositely disposed burrs 42 and 44. It has been found that the blade illustrated in FIGURES 11–13 is especially suitable for use in cutting and shearing open and closed cell foam type materials and for a wide variety of other low density products, rigid or flexible. The burrs on the lower teeth 20 serve to cut a widened slot to permit the passage of the blade therein whereas the sharpened edges 50 provide the shearing edge. The cross sectional tooth point shown in FIGURE 14, having a narrow flat top 52 and beveled side edges 52a and 52b is particularly adaptable for use with relatively rigid foam products. Here again, in a blade employing the tooth edge 52, the lower teeth 20 still retain the normal configuration with the oppositely disposed burrs.

In FIGURES 15–17 there is shown further modifications of this invention which also are substantially the same as the blade shown in FIGURES 1–10 except for the following described features. In FIGURE 15 the blade has a more conventional tooth edge 54 with oppositely disposed burrs 54a and 54b. This type of tooth edge may be formed by first punching the tooth edge 16a and then oppositely punching the same edge 16a slightly out of alignment from the first edge formed.

The blade shown in FIGURES 16 and 17 also may be formed by oppositely punching with the same punch to produce a tooth edge such as 56 having opposite burrs 56a and 56b and an upstanding projection 56c for a similar tooth edge 58 having opposite burrs 58a and 58b and an upstanding projection 58c.

It has been found that the principle of producing a blade having aligned teeth with oppositely disposed burrs vastly increases the blade life over that previously known with blades having set teeth. In one example, using a band saw blade following the principles of this invention, the blade was inserted for use under conditions where previous blades of similar material normally had a useful life of 40 hours with frequent sharpening. The blade embodying the principles of this invention remained satisfactorily operative after 250 hours of cutting under the same conditions. Thus it is to be noted that the blade of this invention not only produces a substantial reduction in manufacturing cost since it may be formed by mere opposite punching with the same punch and does not require the teeth to be set, it actually produces a saw blade which is vastly superior than that previously known. The oppositely disposed burrs which are a normal incident to punching provide the lateral projections for clearing a path wider than the width of the blade and permit the blade to easily pass through the material being cut thereby. It is to be further noted that after the blade has been punched from opposite sides no further machining is necessary. The burrs do not have to be ground down, the teeth do not have to be set, nor is an additional punching step necessary. All that is required to produce the blade of this invention is controlled opposite punching with the same punch. This simple step results in a vastly superior blade possessing a useful life many times greater than previously known with conventionally known saw blades.

While I have shown and described certain embodiments of my invention, it is to be understood that it is capable of many modifications. Changes, therefore, in the construction and arrangement may be made without departing from the spirit and scope of my invention as set out in the appended claims.

We claim:

1. A saw blade of the character described having a plurality of aligned raised and lowered teeth, each raised tooth having a substantially upright front edge, an upwardly inclined top edge joined to the front edge and inclined upwardly therefrom, a downwardly sloping top edge joined to the upwardly inclined edge and sloping downwardly therefrom, and a substantially upright rear edge descending from said downwardly sloping top edge, each lower tooth having an upwardly inclined edge extending from said upright rear edge; a downwardly sloping edge extending from said lower tooth upwardly inclined edge and terminating at the base of the front edge of the next succeeding raised tooth.

2. The saw blade of claim 1 wherein each tooth edge has an oppositely arranged burr portion projecting outwardly therefrom.

3. The saw blade of claim 2 wherein the raised teeth have sharpened edges and the lowered teeth have burred edges.

4. The saw blade of claim 3 wherein the burred edges on the lower teeth project outwardly from opposite sides of the blade on successive alternate lower teeth.

5. The saw blade of claim 4 wherein the burred edges project a substantially equal distance outwardly from the opposite edges of the blade.

References Cited by the Examiner

UNITED STATES PATENTS

| 105,261 | 1/1870 | Shailer | 143—133 |
| 468,742 | 2/1892 | Ericson. | |
| 2,510,462 | 6/1950 | Christenson. | |
| 2,603,251 | 7/1952 | Christenson | 143—133 |
| 3,117,472 | 1/1964 | Mingus et al. | 76—112 |

DONALD R. SCHRAN, *Primary Examiner.*

WILLIAM W. DYER, JR., *Examiner.*